US 8,425,655 B2

(12) United States Patent
Chen et al.

(10) Patent No.: US 8,425,655 B2
(45) Date of Patent: Apr. 23, 2013

(54) GAS PRESSURIZED SEPARATION COLUMN AND PROCESS TO GENERATE A HIGH PRESSURE PRODUCT GAS

(75) Inventors: Shiaoguo Chen, Pittsburgh, PA (US); Zijiang Pan, Pittsburgh, PA (US)

(73) Assignee: Carbon Capture Scientific, LLC, Pittsburgh, PA (US)

( * ) Notice: Subject to any disclaimer, the term of this patent is extended or adjusted under 35 U.S.C. 154(b) by 302 days.

(21) Appl. No.: 12/833,906

(22) Filed: Jul. 9, 2010

(65) Prior Publication Data

US 2012/0009114 A1 Jan. 12, 2012

(51) Int. Cl.
*B01D 53/14* (2006.01)

(52) U.S. Cl.
USPC ........ 95/16; 95/161; 95/162; 95/163; 95/165; 95/166; 95/167; 95/171; 95/172; 95/173; 95/174; 95/178; 95/179; 95/180; 95/183; 95/199; 95/223; 95/227; 95/228; 95/236; 96/234

(58) Field of Classification Search .................. 423/220, 423/228, 229, 437.1; 96/202; 95/169, 236, 95/263
See application file for complete search history.

(56) References Cited

U.S. PATENT DOCUMENTS

| | | | | |
|---|---|---|---|---|
| 2,196,281 A * | 4/1940 | Voorhees | ...................... | 423/227 |
| 3,563,696 A * | 2/1971 | Benson, H.E. | ................ | 423/223 |
| 4,035,166 A * | 7/1977 | Van Hecke | ...................... | 95/163 |
| 4,557,911 A * | 12/1985 | Goddin et al. | ................ | 423/228 |
| 5,832,712 A * | 11/1998 | Rønning et al. | ................ | 60/783 |
| 6,497,852 B2 * | 12/2002 | Chakravarti et al. | .......... | 423/228 |
| 7,699,908 B2 | 4/2010 | Menzel | | |
| 2001/0026779 A1 | 10/2001 | Chakravarti et al. | | |
| 2002/0081256 A1 | 6/2002 | Chakravarti et al. | | |
| 2002/0132864 A1 | 9/2002 | Searle | | |
| 2004/0123737 A1 | 7/2004 | Filippi et al. | | |
| 2004/0253159 A1 * | 12/2004 | Hakka et al. | ................... | 423/228 |
| 2005/0132884 A1 * | 6/2005 | Xu et al. | .......................... | 95/236 |
| 2006/0178259 A1 * | 8/2006 | Schubert et al. | ................ | 502/56 |
| 2006/0204425 A1 | 9/2006 | Kamijo et al. | | |
| 2006/0248890 A1 | 11/2006 | Iijima et al. | | |
| 2007/0028774 A1 * | 2/2007 | Rochelle | ......................... | 95/236 |
| 2007/0148068 A1 | 6/2007 | Burgers et al. | | |

(Continued)

FOREIGN PATENT DOCUMENTS

| | | |
|---|---|---|
| WO | WO2004080573 | 9/2004 |
| WO | WO2010043859 | 4/2010 |
| WO | WO 2010043859 A1 * | 4/2010 |

*Primary Examiner* — Duane Smith
*Assistant Examiner* — Ives Wu
(74) *Attorney, Agent, or Firm* — Blynn L. Shideler; Krisanne Shideler; BLK Law Group

(57) ABSTRACT

The present invention provides a gas pressurized separation system to strip a product gas from a liquid stream and yield a high pressure gaseous effluent containing the product gas. The system comprises a gas pressurized stripping apparatus, such as a column, with at least one first inlet allowing flow of one or more liquid streams in a first direction and at least one second inlet allowing flow of one or more high pressure gas streams in a second direction, to strip the product gas into the high pressure gas stream and yield through at least one outlet a high pressure gaseous effluent containing the product gas; and two or more heat supplying apparatuses provided at different locations along the column. Processes for separating a product gas from a gaseous mixture to yield a high pressure gaseous effluent containing the product gas, utilize the gas pressurized separation system described above.

20 Claims, 10 Drawing Sheets

U.S. PATENT DOCUMENTS

| | | |
|---|---|---|
| 2007/0148069 A1 | 6/2007 | Chakravarti et al. |
| 2007/0283813 A1 | 12/2007 | Iijima et al. |
| 2008/0016868 A1 | 1/2008 | Ochs et al. |
| 2008/0056972 A1 | 3/2008 | Iijima |
| 2008/0072752 A1 | 3/2008 | Kumar |
| 2008/0159937 A1 | 7/2008 | Ouimet |
| 2008/0223215 A1 | 9/2008 | Iijima et al. |
| 2008/0286189 A1 | 11/2008 | Rasmus et al. |
| 2009/0193970 A1 | 8/2009 | Iijima et al. |
| 2009/0202410 A1 | 8/2009 | Kawatra et al. |
| 2009/0211447 A1 | 8/2009 | Lichtfers et al. |
| 2009/0235822 A1 | 9/2009 | Anand et al. |
| 2010/0005966 A1 | 1/2010 | Wibberley |
| 2010/0024476 A1 | 2/2010 | Shah et al. |
| 2010/0037521 A1 | 2/2010 | Vakil et al. |
| 2010/0083696 A1 | 4/2010 | Hoang-Dinh et al. |

* cited by examiner

GAS PRESSURIZED SEPARATION COLUMN AND PROCESS TO GENERATE A HIGH PRESSURE PRODUCT GAS

FIELD OF THE INVENTION

The present invention relates to gas pressurized separation columns and to processes utilizing the columns.

BACKGROUND OF THE INVENTION $CO_2$ capture from utility flue gas is the most expensive step in an integrated carbon capture and sequestration (CCS) process. The current commercial state of the art of capture technology utilizes amine-based absorption technology. A typical, conventional process 10 using an absorption column 12 is illustrated in FIG. 1. Raw flue gas 14 enters the absorption column 12 and clean flue gas 16 exits as described below. A $CO_2$-lean solution 18 enters into an absorption column 12 from the top and flows downward. By contacting the flue gas countercurrent, the solution absorbs most of the $CO_2$ in the flue gas in the absorption column 12 and produces a $CO_2$-rich solution exiting at 20. The $CO_2$-rich solution goes through pump 22 and in line 24 goes through heat exchanger 26. After exchanging heat with the $CO_2$-lean solution from the bottom of the stripping column 30, or stripper, the rich solution in line 28 enters the stripper 30 from the top and flows downwards. $CO_2$ in the rich solution is stripped out by water vapor flowing upward. The heat required to strip the absorbed $CO_2$ is entirely provided by water vapor. Line 49 provides pulls water/steam from the stripper 30 to be supplied to a reboiler 46 at the bottom of the stripper 30 with associated steam line 48. The heated water vapor from the reboiler 46 is supplied to the bottom of the stripper 30 through line 50. The $CO_2$-lean solution in line 32 from the bottom of the stripper 30 goes through pump 34 and to the cross heat exchanger 26 through line 36. The $CO_2$-lean solution from the stripper 30 exits heat exchanger 26 in line 38 and is then further cooled in cooling unit 40 before it enters the absorber in line 18 and the cycle repeats. Make-up solvent (amine) may be added through line 42 into the lean solution. The stripped $CO_2$ exits the stripper 30 at the top in line 52 extending through cooler 56, having return line 58, with $CO_2$ leaving through line 60.

A conventional absorption/stripping process is energy intensive. The heat requirement in the stripper consists of three components:

$$Q_{total} = Q_{sensible} + Q_{reaction} + Q_{stripping} \quad (1)$$

Here $Q_{reaction}$ is the heat of reaction (also called heat of absorption), which is the same as the heat released during absorption in the absorption column; $Q_{sensible}$ is the sensible heat, which is the heat required to heat the $CO_2$-rich solution from its temperature entering the stripper to the temperature of $CO_2$-lean solution leaving the reboiler; and $Q_{stripping}$ is the stripping heat, that is, the heat required to generate the water vapor coming out from the top of the stripper. Each component can be calculated by the following respective equations:

$$Q_{Sensible} = \frac{C_p(T_{lean} - T_{feed})}{\Delta \text{ Loading}} = H_{Lean} - H_{Rich} \quad (2)$$

$$Q_{reaction} = \Delta H_{reaction} \quad (3)$$

$$Q_{stripping} = \left(\frac{P_{H2O}}{P_{CO2}}\right)_{Top\ of\ the\ stripper} \times \Delta H_{H2O} \quad (4)$$

Here,
$\Delta$Loading is the $CO_2$ difference per kg in solution between lean and rich;
$C_p$ is the heat capacity of the solution in kJ/kg solution;
$\Delta H_{reaction}$ and $\Delta H_{H2O}$ are the heat of reaction and heat of vaporization of water, respectively;
$T_A$ and $T_S$ are the absorption and stripping temperatures, respectively;
$T_{Lean}$ and $T_{feed}$ are the temperature of lean solution from the stripper and the temperature of the rich solution to the stripper (after cross heat exchanger);
$H_{Lean}$ and $H_{Rich}$ are the enthalpy of the lean solution and the rich solution;
$P_{H_2O}$ and $P_{CO_2}$ are the partial pressures of water and $CO_2$ respectively; and
R is the gas constant.

When monoethanolamine (MEA) is used as solvent, the $Q_{sensible}$, $Q_{reaction}$, and $Q_{stripping}$ for the amine-based absorption processes are roughly 480, 800, and 270 Btu/lb $CO_2$ respectively, with a total of around 1550 Btu/lb $CO_2$.

There are several fundamental disadvantages to the conventional stripping processes, including:

(a) The operating pressure of the stripper is determined by vapor pressure of the $CO_2$-lean solution in the reboiler, which in turn is determined by composition of lean solution and the reboiler temperature. In order to increase the operating pressure the temperature in the reboiler has to be raised, which is often limited by the stability of the amine solvents. The reboiler temperature in a conventional stripper is typically at 120° C. and the operating pressure is thus limited at around 28 psia.

(b) Heat required for $CO_2$ stripping is entirely provided by water vapor generated in the reboiler. Thus, water vapor is used not only as stripping gas but also as a heat carrier. Due to the dual functions of steam $P_{H_2O}$ and $P_{CO_2}$ in the stripper from bottom to top are all correlated with each other.

(c) Due to the low operating pressure (~28 psia) of the stripper (thus low pressure of $CO_2$ product), a large amount of compression work is required to compress the $CO_2$ product to a pipeline transportation-ready pressure (~2250 psia).

As noted above, current state-of-the-art technology for $CO_2$ separation from post-combustion flue gas uses amine-based absorption processes. However, all amine-based absorption processes use steam as the heat carrying medium and stripping gas and thus the operating pressure of the stripper is determined by the reboiler temperature. Recent attempts to overcome the drawbacks of conventional systems include using a non-steam stripping gas into the stripping system. One would expect that the added stripping gas should be easily separated from $CO_2$ and aqueous solution; organic vapors are therefore ideal selections. For example, in one study, an organic compound (hexane) was added into the stripping system to increase the pressure of the stripper. However, no external heat sources except heat from the reboiler were added to the stripping column and as a result, the temperature distribution within the stripper is coupled. Therefore, the energy performance of hexane stripping system was even worse than the conventional stripping system.

Others have addressed carbon dioxide recovery in a variety of applications including U.S. Patent Publication No. 2002-0081256 to Chakravarti, Shrikar, et al. discloses carbon dioxide recovery at high pressure which (A) providing a gaseous feed stream comprising carbon dioxide, wherein the pressure of said feed stream is up to 30 psia; (B) preferentially absorbing carbon dioxide from said feed stream into a liquid absorbent fluid to form a carbon dioxide enriched liquid absorbent stream; (C) in any sequence or simultaneously, pressurizing said carbon dioxide enriched liquid absorbent stream to a pressure sufficient to enable the stream to reach the top of the stripper at a pressure of 35 psia or greater, and heating the carbon dioxide enriched liquid absorbent stream to obtain a heated carbon dioxide enriched liquid absorbent stream; and (D) stripping carbon dioxide from said carbon dioxide enriched liquid absorbent stream in a stripper operating at a pressure of 35 psia or greater and recovering from said stripper a gaseous carbon dioxide product stream having a pressure of 35 psia or greater. In another aspect of this process, the stripped liquid absorbent fluid from the stripper is recycled to step (B).

U.S. Patent Publication No. 2002-0026779 to Chakravarti, Shrikar, et al. discloses a system for recovering absorbate such as carbon dioxide from an oxygen containing mixture wherein carbon dioxide is concentrated in an alkanolamine containing absorption fluid, oxygen is separated from the absorption fluid, the resulting fluid is heated, and carbon dioxide is steam stripped from the absorption fluid and recovered.

U.S. Patent Publication No. 2002-0132864 to Searle, Ronald G., discloses a method for recovering carbon dioxide from an ethylene oxide production process and using the recovered carbon dioxide as a carbon source for methanol synthesis. More specifically, carbon dioxide recovered from an ethylene oxide production process is used to produce a syngas stream. The syngas stream is then used to produce methanol.

U.S. Patent Publication No. 2004-0123737 to Filippi, Ermanno, et al. discloses a process for the separation and recovery of carbon dioxide from waste gases produced by combustible oxidation is described comprising the steps of feeding a flow of waste gas to a gas semipermeable material, separating a gaseous flow comprising high concentrated carbon dioxide from said flow of waste gas through said gas semipermeable material, and employing at least a portion of said gaseous flow comprising high concentrated carbon dioxide as feed raw material in an industrial production plant and/or stockpiling at least a portion of said gaseous flow comprising carbon dioxide.

U.S. Patent Publication No. 2004-0253159 to Hakka, Leo E., et al. discloses process for recovering $CO_2$ from a feed gas stream comprises treating the feed gas stream with a regenerated absorbent comprising at least one tertiary amine absorbent having a $pK_a$ for the amino function of from about 6.5 to about 9 in the presence of an oxidation inhibitor to obtain a $CO_2$ rich stream and subsequently treating the $CO_2$ rich stream to obtain the regenerated absorbent and a $CO_2$ rich product stream. The feed gas stream may also include $SO_2$ and/or $NO_x$.

U.S. Patent Publication No. 2006-0204425 to Kamijo, Takashi, et al. discloses an apparatus and a method for recovering $CO_2$ are provided in which energy efficiency is improved. The apparatus for recovering $CO_2$ includes a flow path for returning extracted, temperature risen semi-lean solution into a regeneration tower wherein at least a part of the semi-lean solution obtained by removing a partial $CO_2$ from a rich solution infused in a regeneration tower from an upper part of the regeneration tower is extracted, raised its temperature by heat exchanging with a high-temperature waste gas in a gas duct of an industrial facility such as a boiler, and then returned into the regeneration tower.

U.S. Patent Publication No. 2006-0248890 to Iijima, Masaki, et al. discloses a carbon dioxide recovery system capable of suppressing reduction in turbine output at the time of regenerating an absorption liquid with carbon dioxide absorbed therein, a power generation system using the carbon dioxide recovery system, and a method for these systems. The carbon dioxide recovery system includes a carbon dioxide absorption tower which absorbs and removes carbon dioxide from a combustion exhaust gas of a boiler by an absorption liquid; and a regeneration tower which heats and regenerates a loaded absorption liquid with carbon dioxide absorbed therein, is characterized in that the regeneration tower is provided with plural loaded absorption liquid heating means in multiple stages, which heat the loaded absorption liquid and remove carbon dioxide in the load absorption liquid, in that a turbine driven and rotated by steam of the boiler is provided with plural lines which extract plural kinds of steam with different pressures from the turbine and which supply the plural kinds of steam to the plural loaded absorption liquid heating means as their heating sources, and in that the plural lines are connected to make the pressure of supplied steam increased from a preceding stage of the plural loaded absorption liquid heating means to a post stage of the plural loaded absorption liquid heating means.

U.S. Patent Publication No. 2007-0148068 to Burgers, Kenneth L, et al. discloses an alkanolamine absorbent solution useful in recovering carbon dioxide from feed gas streams is reclaimed by subjecting it to vaporization in two or more stages under decreasing pressures.

U.S. Patent Publication No. 2007-0148069 to Chakravarti, Shrikar, et al. discloses a system in which carbon dioxide is recovered in concentrated form from a gas feed stream also containing oxygen by absorbing carbon dioxide and oxygen into an amine solution that also contains another organic component, removing oxygen, and recovering carbon dioxide from the absorbent.

U.S. Patent Publication No. 2007-0283813 to Iijima, Masaki, et al. discloses a $CO_2$ recovery system which includes an absorption tower and a regeneration tower. $CO_2$ rich solution is produced in the absorption tower by absorbing $CO_2$ from $CO_2$-containing gas. The $CO_2$ rich solution is conveyed to the regeneration tower where lean solution is produced from the rich solution by removing $CO_2$. A regeneration heater heats lean solution that accumulates near a bottom portion of the regeneration tower with saturated steam thereby producing steam condensate from the saturated steam. A steam-condensate heat exchanger heats the rich solution conveyed from the absorption tower to the regeneration tower with the steam condensate. See also U.S. Patent Publication Nos. 2008-0056972; 2008-0223215; and 2009-0193970 to Iijima, Masaki, et al.

U.S. Patent Publication No. 2008-0016868 to Ochs, Thomas L., et al. discloses a method of reducing pollutants exhausted into the atmosphere from the combustion of fossil fuels. The disclosed process removes nitrogen from air for combustion, separates the solid combustion products from the gases and vapors and can capture the entire vapor/gas stream for sequestration leaving near-zero emissions.

U.S. Patent Publication No. 2008-0072752 to Kumar, Ravi discloses a vacuum pressure swing adsorption (VPSA) processes and apparatus to recover carbon dioxide having a purity of approximately 90 mole % from streams containing at least carbon dioxide and hydrogen (e.g., syngas). The feed to the carbon dioxide VPSA unit can be at super ambient pressure. The carbon dioxide VPSA unit produces three streams, a hydrogen-enriched stream, a hydrogen-depleted stream and a carbon dioxide product stream. The recovered carbon dioxide can be further upgraded, sequestered or used in applications such as enhanced oil recovery (EOR).

U.S. Patent Publication No. 2008-0159937 to Ouimet, Michel a., et al. discloses that "it has surprisingly been determined that using selected amines, a [Carbon Dioxide] capture process may be conducted using substantially reduced energy input."

U.S. Patent Publication No. 2008-0286189 to Find, Rasmus, et al. discloses a method for recovery of high purity carbon dioxide, which is substantially free of nitrogen oxides. This reference also discloses a plant for recovery of said high purity carbon dioxide comprising an absorption column, a flash column, a stripper column, and a purification unit.

U.S. Patent Publication No. 2009-0202410 to Kawatra, Surendra K., et al. discloses a process for the capture and sequestration of carbon dioxide that would otherwise enter the atmosphere and contribute to global warming and other problems. $CO_2$ capture is accomplished by reacting carbon dioxide in flue gas with an alkali metal carbonate, or a metal oxide, particularly containing an alkaline earth metal or iron, to form a carbonate salt. A preferred carbonate for $CO_2$ capture is a dilute aqueous solution of additive-free ($NA_2 CO_3$). Other carbonates include ($K_2 CO_3$) or other metal ion that can produce both a carbonate and a bicarbonate salt.

U.S. Patent Publication No. 2009-0211447 to Lichtfers, Ute, et al. discloses a process for the recovery of carbon dioxide, which includes: (a) an absorption step of bringing a carbon dioxide-containing gaseous feed stream into gas-liquid contact with an absorbing fluid, whereby at least a portion of the carbon dioxide present in the gaseous stream is absorbed into the absorbing fluid to produce (i) a refined gaseous stream having a reduced carbon dioxide content and (ii) an carbon dioxide-rich absorbing fluid; and (b) a regeneration step of treating the carbon dioxide-rich absorbing fluid at a pressure of greater than 3 bar (absolute pressure) so as to liberate carbon dioxide and regenerate a carbon dioxide-lean absorbing fluid which is recycled for use in the absorption step, in which the absorbing fluid is an aqueous amine solution containing a tertiary aliphatic alkanol amine and an effective amount of a carbon dioxide absorption promoter, the tertiary aliphatic alkanol amine showing little decomposition under specified conditions of temperature and pressure under co-existence with carbon dioxide.

U.S. Patent Publication No. 2009-0235822 to Anand, Ashok K., et al discloses a $CO_2$ system having an acid gas removal system to selectively remove $CO_2$ from shifted syngas, the acid gas removal system including at least one stage, e.g. a flash tank, for $CO_2$ removal from an input stream of dissolved carbon dioxide in physical solvent, the method of recovering $CO_2$ in the acid gas removal system including: elevating a pressure of the stream of dissolved carbon dioxide in physical solvent; and elevating the temperature of the pressurized stream upstream of at least one $CO_2$ removal stage.

U.S. Patent Publication No. 2010-0005966 to Wibberley, Louis discloses a $CO_2$ capture method in which at an absorber station, $CO_2$ is absorbed from a gas stream into a suitable solvent whereby to convert the solvent into a $CO_2$-enriched medium, which is conveyed to a desorber station, typically nearer to a solar energy field than to the absorber station. Working fluid, heated in the solar energy field by insulation, is employed to effect desorption of $CO_2$ from the $CO_2$-enriched medium, whereby to produce separate $CO_2$ and regenerated solvent streams. The regenerated solvent stream is recycled to the absorber station. The $CO_2$-enriched medium and/or the regenerated solvent stream may be selectively accumulated so as to respectively optimize the timing and rate of absorption and desorption of $CO_2$ and/or to provide storage of solar energy.

U.S. Patent Publication No. 2010-0024476 to Shah, Minish M., et al discloses a carbon dioxide recovery process in which carbon dioxide-containing gas such as flue gas and a carbon dioxide-rich stream are compressed and the combined streams are then treated to desorb moisture onto adsorbent beds and then subjected to subambient-temperature processing to produce a carbon dioxide product stream and a vent stream. The vent stream is treated to produce a carbon dioxide-depleted stream which can be used to desorb moisture from the beds, and a carbon dioxide-rich stream which is combined with the carbon dioxide-containing gas.

U.S. Patent Publication No. 2010-00037521 to Vakil, Tarun D., et al discloses a new steam reformer unit design, a hydrogen PSA unit design, a hydrogen/nitrogen enrichment unit design, and processing scheme application. The discussed result of these innovations allegedly results in reallocating most of the total hydrogen plant $CO_2$ emissions load to high pressure syngas stream exiting the water gas shift reactor while minimizing the $CO_2$ emissions load from the reformer furnace flue gas.

The above identified patent publications are helpful for identifying certain concepts known in the art and are incorporated herein by reference.

It would be desirable to develop a separation system and separation processes that overcome issues of the prior art systems and reduce the energy consumption of a separation process significantly.

SUMMARY OF THE INVENTION

The present invention is drawn to a gas pressurized separation system or process to strip a product gas from a liquid stream and yield a high pressure gaseous effluent containing the product gas. The system comprises a gas pressurized stripping apparatus, such as a column, with at least one first inlet allowing flow of one or more liquid streams into the apparatus, generally in a first direction, and at least one second inlet allowing flow of one or more high pressure gas streams into the apparatus, generally in a second direction, to strip the product gas into the high pressure gas stream and yield through at least one outlet a high pressure gaseous effluent that contains the product gas. The system further comprises heating apparatuses for controlling the temperature two or more heat supplying apparatuses provided at different locations along the column for allowing for independent control of the temperature along the stripping apparatus or column.

Also provided is a process for separating a product gas from a gaseous mixture to yield a high pressure gaseous effluent in which the product gas has a partial pressure at least 10 times higher than in the gaseous mixture, the process comprising: (a) introducing the gaseous mixture into contact with a liquid flowing in an absorption apparatus, to absorb the product gas into the liquid and yield a product-enriched liquid; (b) introducing the product-enriched liquid into at least one inlet of a gas pressurized column and into contact with one or more high pressure gas streams to strip the product gas into the high pressure gas stream and to yield a product-lean liquid and one or more high pressure gaseous effluents enriched with the product gas, wherein the product gas has a partial pressure higher than in the gaseous mixture; (c) recovering heat from the product-lean liquid; and (d) recycling at least a portion of the product-lean liquid to step (a).

It is believed that the process can reduce the energy requirement in the stripping column and produce a high pressure, pure product gas stream, which will reduce subsequent compression work.

The present invention is described in greater detail in the following description of the present invention wherein like elements are given like reference numerals throughout.

DETAILED DESCRIPTION OF THE INVENTION

A gas pressurized separation system of the present invention comprises a gas pressurized stripping column with at least one first inlet allowing flow of one or more liquid streams in a first direction and at least one second inlet allowing flow of one or more high pressure gas streams in a second direction. The directions of each stream within the column may be the same as or different from each other, and may change with respect to each other. For example, they may be co-current (in the same direction) or counter-current (opposite directions) to each other, or anywhere between these two extremes; for example, perpendicular to each other. Also, contact between the streams may include intimate and/or turbulent mixing of the streams.

The separation column may further comprise two or more heat supplying apparatus, such as heat exchangers or heating coils, positioned in different locations along the column. The heat supplying apparatuses may be connected to each other, such as in a coil arrangement wherein heat is supplied in theoretically up to infinite different locations along the length of the column. Alternatively, the heat supplying apparatuses may be separate from each other with means for independent control of the temperature along the stripping column. Whether connected or not, within the meaning of this application the heat supplying apparatuses are considered or counted via the distinct locations (where the liquid has different product gas loadings) at which heat is supplied. Thus a single continuous heating unit that supplies heat at a plurality of different locations is a plurality of heating sources within this application. The heat supplying apparatuses may be internal to or external to the column and may be spaced evenly or otherwise spaced along the column. The heat supplying apparatuses may be integral to trays in a tray-type column or integral to packing in a packed column.

The second inlet in the gas pressurized separation system of the present invention is designed to accommodate one or more high pressure gas streams, with pressures of at least 10 atm, often at least 30 atm, 50 atm and even at least 100 atm. The high pressure gas stream may be a single pure gas, or may comprise a mixture of different gases. It may also contain a portion of the desired product gas.

Figure 1:
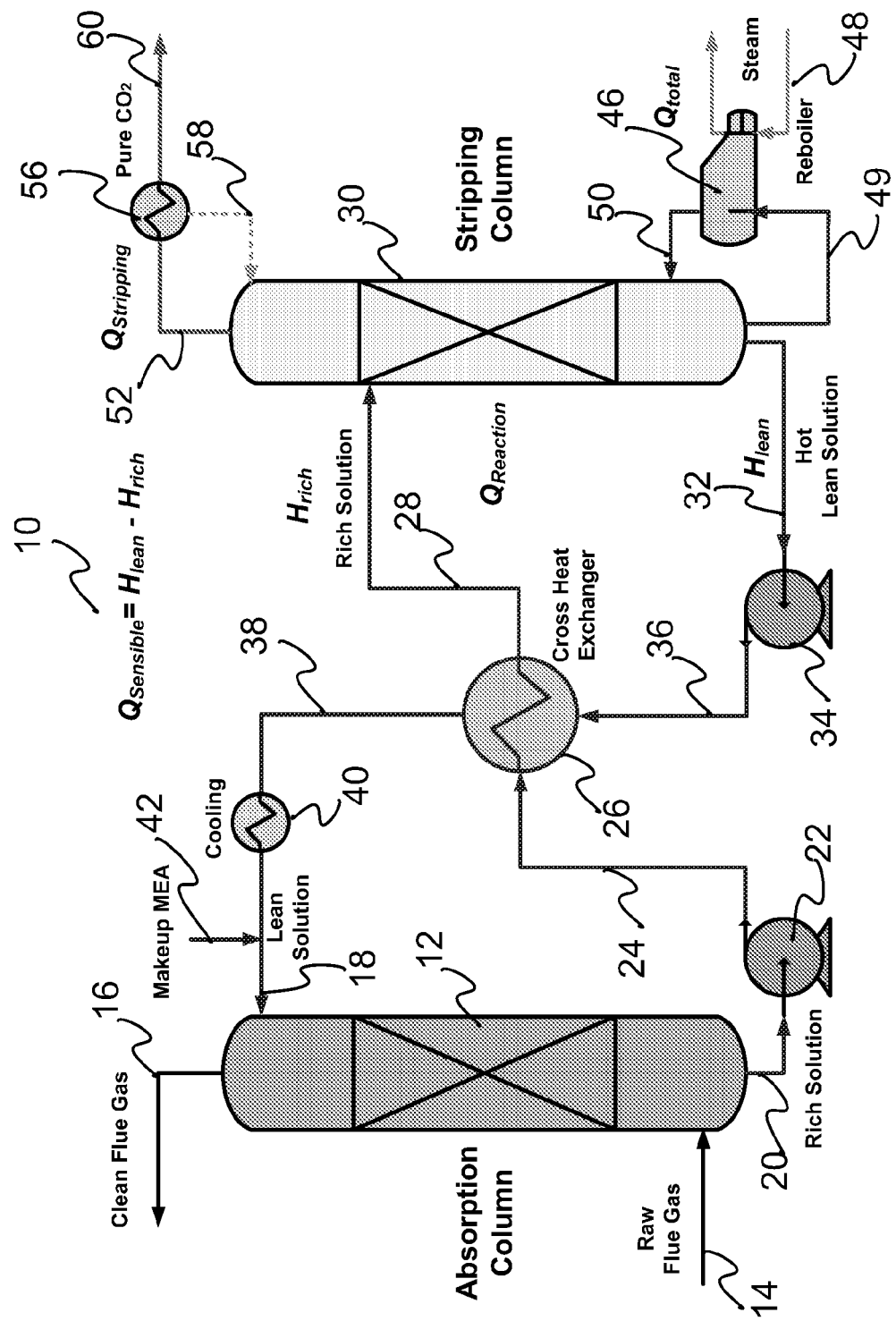
FIG. 1 is a schematic diagram of a conventional prior art absorption process for $CO_2$ separation.
Figure 2:
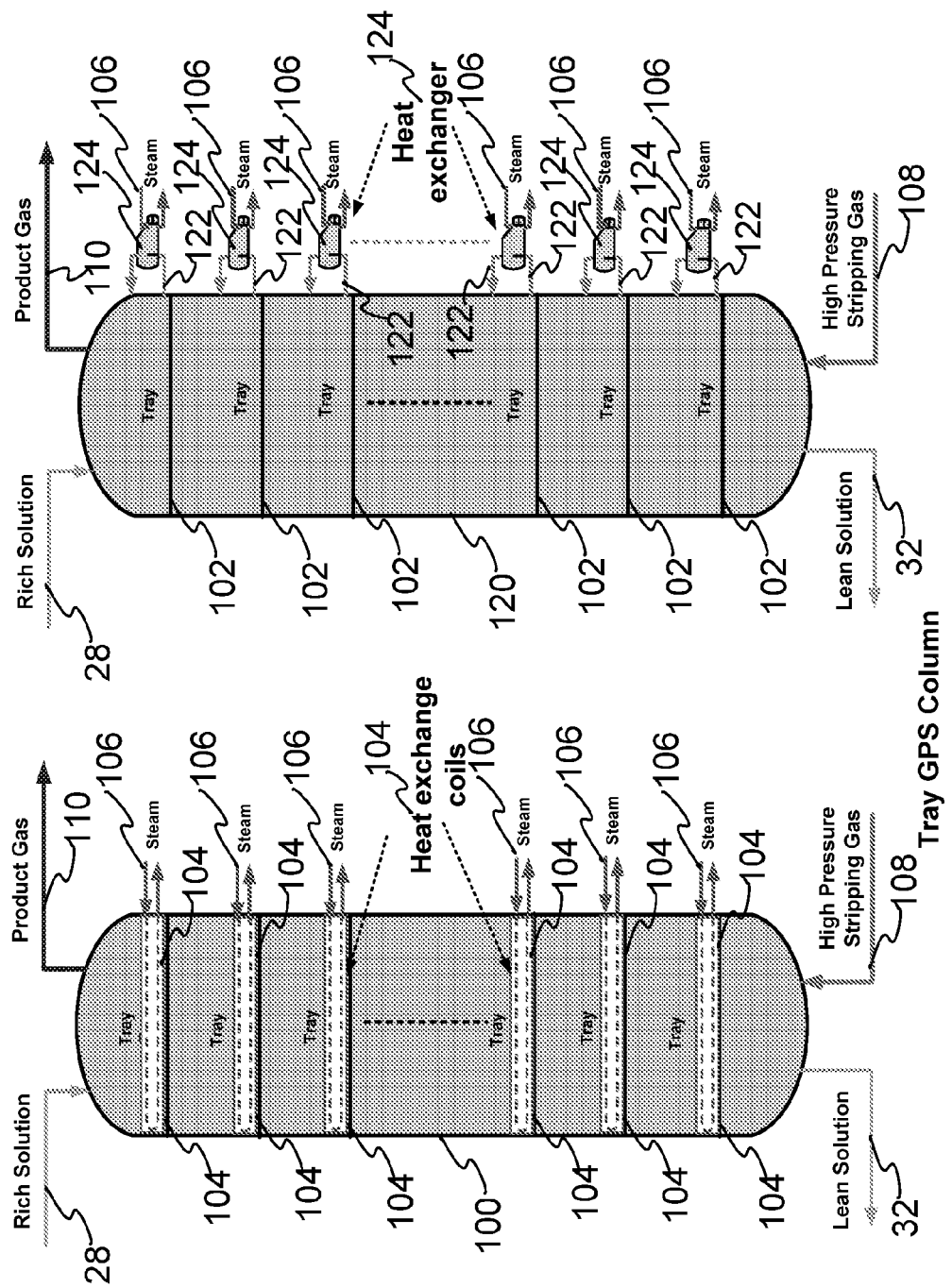
FIG. 2 illustrates a tray-type gas pressurized column in accordance with one aspect of the present invention.
Figure 3:
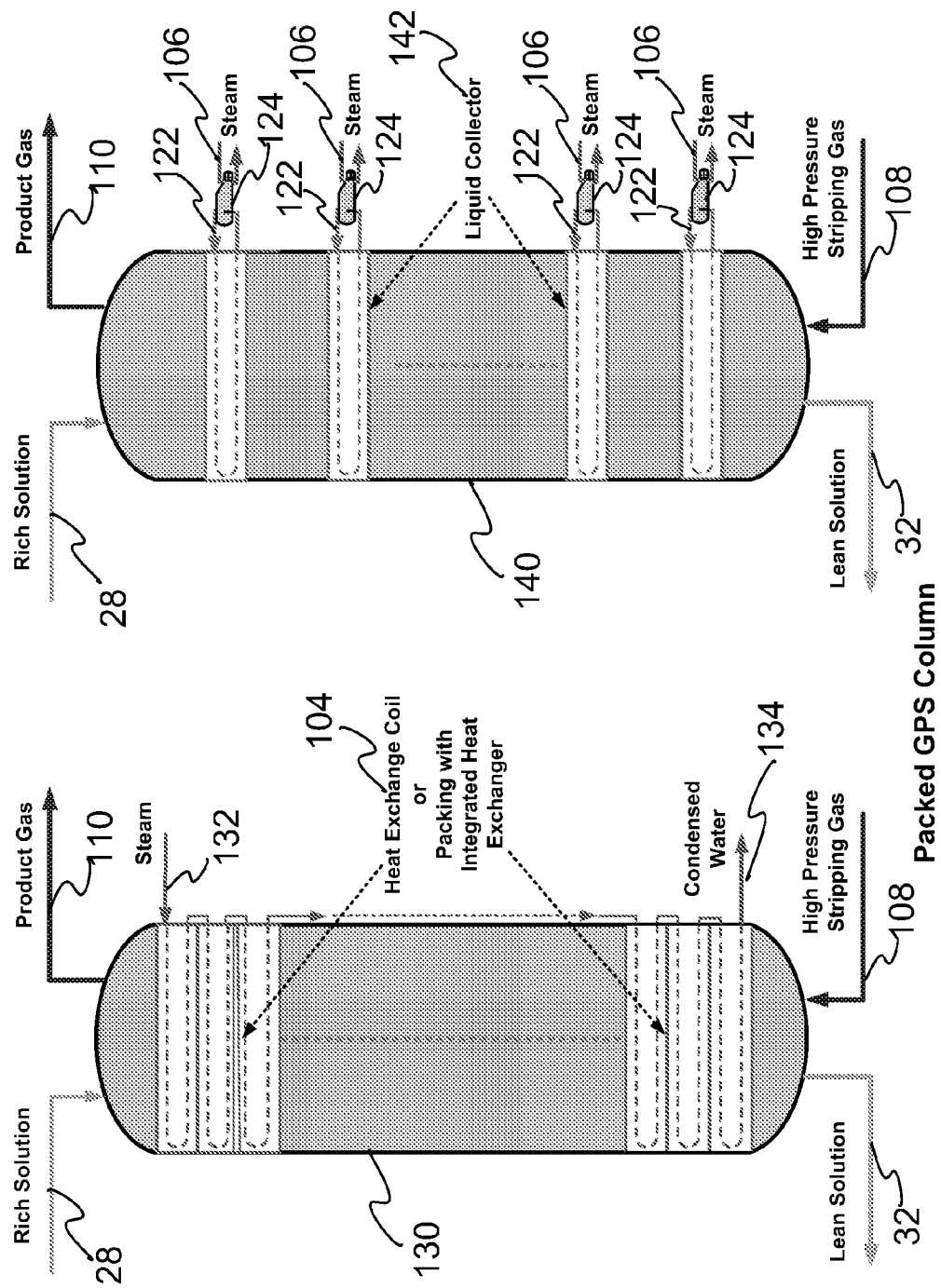
FIG. 3 illustrates a packed gas pressurized column in accordance with one aspect of the present invention.

FIG. 2 depicts a tray-type separation column 100 or 120, while FIG. 3 illustrates a packed column 130 or 140. In the operation of the separation column of the present invention, a liquid containing a desired product gas is introduced as a first stream into the column from one end, e.g., the top, through a first inlet and flows in a first direction, typically downward. A high pressure stripping gas stream is introduced to the column, for example, from the bottom, through a second inlet and flows countercurrent to the first stream. The use of a high pressure gas stream allows for stripping and recovery of the desired product gas from the first stream in a high pressure output stream comprising a gaseous effluent.

The columns depicted in FIGS. 2 and 3 have only one feed stream inlet 28 and one high pressure stripping gas stream inlet 108, as shown. In principle, however, multiple feed streams or multiple stripping gas streams are possible. Additionally, one or more side products (either gas phase product or liquid phase products) may be extracted if desired.

In the tray type column 100 of FIG. 2, the rich solution enters column 100 at line 28, with the stripping column 100 having multiple trays 102 each having a heating coil 104 associated with a steam line 106. Lean solution exits at the bottom of the stripping column 100 at line 32. High pressure stripping gas is supplied to the bottom of the stripping column 100 at line 108 and the product gas exits the top of the stripping column at 110.

In the tray type column 120 of FIG. 2, the rich solution enters column 120 at line 28, with the stripping column 120 having multiple trays 102 each having an external heating apparatus 124 associated with a steam line 106 and with a liquid recirculation line 122 drawing liquid from the column 120 at the tray 102. Lean solution exits at the bottom of the stripping column 120 at line 32. High pressure stripping gas is supplied to the bottom of the stripping column 120 at line 108 and the product gas exits the top of the stripping column 120 at 110.

In the packed type column 130 of FIG. 3, the rich solution enters column 130 at line 28, with the stripping column 130 having an internal steam circuit with entrance 132 near the top of the stripping column 130 and an exit 134 near the bottom of the stripping column, and with spaced heating coils 104 positioned along the steam circuit. Lean solution exits at the bottom of the stripping column 130 at line 32. High pressure stripping gas is supplied to the bottom of the stripping column 130 at line 108 and the product gas exits the top of the stripping column 130 at 110.

In the packed type column 140 of FIG. 3, the rich solution enters column 140 at line 28 at the top. The stripping column 140 has multiple liquid collector sites 142 each having an external heating apparatus 124 associated with a steam line 106 and with a liquid recirculation line 122 drawing liquid from the column 140 at the associated collector 142. Lean solution exits at the bottom of the stripping column 140 at line 32. High pressure stripping gas is supplied to the bottom of the stripping column 140 at line 108 and the product gas exits the top of the stripping column 140 at 110.

The two pairs of columns 100/120 and 130/140 in the respective FIGS. 2 and 3 display examples of two different heat supply configurations. In the left columns 100 and 130, heat is supplied through multiple heat supplying apparatuses such as coils 104 residing inside the respective column 100 and 130 on each tray 102 in column 100 or at certain intermittent heights of packing in column 130. In the right column 120 and 140, heat is supplied by multiple external heat supplying apparatuses 124 such as steam from line 106 passing through external heat exchangers forming the heating apparatus 124, heating liquid diverted from the column 120 or 140 at intermittent levels in associated lines 122. The use of multiple heat supplying apparatuses 104 or 124 further enables the columns to yield a high pressure output stream at line 110 using less energy than conventional separation columns.

Varieties of heat supplying apparatuses are suitable for the gas pressurized column of the present invention. FIGS. 2 and 3 are only two typical examples for both tray and packed columns. Other mechanisms are also possible. For example, heat exchanging means may be incorporated into structured packing or a series of heating tubes may be inserted into packing vertically. For tray columns, heat may be supplied through integrated heating elements in the column as well.

In still another example, heat may be provided through the high pressure stripping gases. Either the sensible heat of the high pressure gas or the latent heat of some gas components such as water vapor in the high pressure gas stream can be used.

The number of heat supply apparatuses for the column is flexible, provided there are at least two. The greater the number of the heat supplying apparatuses in the column, the better the potential thermodynamic efficiency of the separation process.

Also provided by the present invention is a process for separating a product gas from a gaseous mixture to yield a high pressure gaseous effluent in which the product gas has a partial pressure at least 10 times higher than in the gaseous mixture, comprising: (a) introducing the gaseous mixture into contact with one or more liquid flowing in an absorption apparatus, to absorb the product gas into the liquid and yield one or more product-enriched liquid; (b) introducing the product-enriched liquid into at least one inlet of a gas pressurized stripping (GPS) column and into contact with one or more high pressure gas streams to strip the product gas into the high pressure gas stream and to yield one or more product-lean liquid and one or more high pressure gaseous effluents enriched with the product gas, wherein the product gas has a partial pressure higher than in the gaseous mixture; (c) recovering heat from the product-lean liquid; and (d) recycling at least a portion of the product-lean liquid to step (a).

Many variations on the process are possible. One or more absorption columns and one or more gas pressurized columns may be arranged in various combinations. For example, the gas pressurized column may be divided into a series of columns that are sequentially connected or a series of gas pressurized columns and conventional stripping columns consecutively connected. Each of the columns may operate at different pressure and temperature. In an extreme case, a gas pressurized column (tray or packed) may be divided into a series of conventional columns connected serially, thus each column will have one heat supplying source. In an even more extreme case, some of the conventional stripping columns may not have any heat supplying source at all. Some of the variations mentioned above may improve the thermodynamic efficiency of the stripping process, but may make the process unnecessarily complicated and capital intensive.

Also, at least a portion of the product-enriched liquid from the absorption column may be introduced into one or more additional absorption columns and contacted with a gas stream that comprises some or all of the gaseous effluent from the gas pressurized column, to absorb more of the product gas into the product-enriched liquid.

Additionally, after step (a) and before step (b), the process may further comprise introducing some or all of the product-enriched liquid from the first absorption column and/or from any additional absorption columns into at least one flasher to remove product gas prior to introduction of the product-enriched liquid into the gas pressurized column. In this embodiment, a plurality of flashers may be used in parallel and the product-enriched liquid from the absorption column is split into several streams for passage through the flashers.

In an additional particular embodiment, the process further comprises after step (a) and before step (b), (i) introducing at least a portion of the product-enriched liquid from the absorption apparatus in step (a) into at least one additional absorption apparatus and into contact with a gas stream that comprises at least a portion of the gaseous effluent from the gas pressurized column in step (b), to absorb the product gas into the product-enriched liquid and yield a further product-enriched liquid; and (ii) subsequently introducing the further product-enriched liquid from the additional absorption apparatus into at least one flasher to recover a portion of the product gas prior to introduction of the product-enriched liquid into the gas pressurized column in step (b). Often more than one additional absorption apparatus is used and they are arranged in series, with the product-enriched liquid leaving each absorber being introduced into the subsequent absorber.

The process of the present invention will be described below using carbon dioxide as the desired product gas. Often carbon dioxide is present in combustion flue gas from a carbonaceous fuel burning facility. This is for illustrative purposes only and is in no way intended to limit the invention.

In a preferred embodiment, the process steps are arranged as follows: absorption/absorption/stripping (flashers)/high pressure gas stripping. This process sequence provides a significant energy savings over conventional separation processes of alternating absorption/stripping/absorption/stripping sequences. In this preferred process, for example, $CO_2$-rich solution (product-enriched liquid) from a first absorption column goes to a second absorption column to absorb $CO_2$ from the gaseous effluent coming from the GPS column. The $CO_2$-rich solution leaving the second absorption column goes through a series of flashers (depending the needs) to produce high pressure, pure $CO_2$. The new product-enriched liquid (a semi-rich solution,) after passing through the flashers, then enters the GPS column to strip out the remaining $CO_2$. In the GPS column a high pressure gas stream is introduced from the bottom to strip the $CO_2$ from the semi-rich solution. The high pressure gas could be any pure gas or mixtures of any gases. Along with the high pressure stripping gas (or gas mixture), multiple heat supplying apparatuses are also provided to the GPS column to deliver heat needed for the stripping process. The gaseous effluent from top of the GPS column is a mixture of $CO_2$ and the high pressure stripping gas, which is recycled to the second absorption column as noted above to have $CO_2$ removed.

The high pressure stripping gas stream may be any gases that are not harmful to solvents in the liquid and will not interfere with the stripping system. Inorganic gases such as He, Ar, $O_2$, $N_2$, air, and their mixtures or organic gases such as $CH_4$, $C_2H_6$, $C_3H_8$, $C_2H_4$ and their mixtures or any mixtures of organic and inorganic gases can all be used as stripping gas. There are virtually unlimited options for the stripping gases. The stripping gases are usually introduced into the GPS column from the bottom and may contain a small amount of carbon dioxide as well. The pressure and the amount of the selected stripping gas are flexible. The pressure is selected based on (and always higher than) the equilibrium partial pressure of $CO_2$ in the rich solution entering the GPS column at stripping conditions. The amount of stripping gas introduced to the GPS column is determined by the desired $CO_2$ loading in the lean solution leaving the GPS column.

The gaseous effluent exiting from the GPS column is a mixture of $CO_2$ (product gas) and the stripping gas. If the stripping gas is nitrogen (which is actually preferred due to its availability, low cost, inertia and negligible solubility in solvent) then the situation will be similar to the separation of the flue gas except that $CO_2$ partial pressure in the gas product is much higher. Obviously, if absorption is the best option for separating $CO_2$ from nitrogen, then the same absorption process can be repeated to separate $CO_2$ from the stripping gas.

Figure 4:
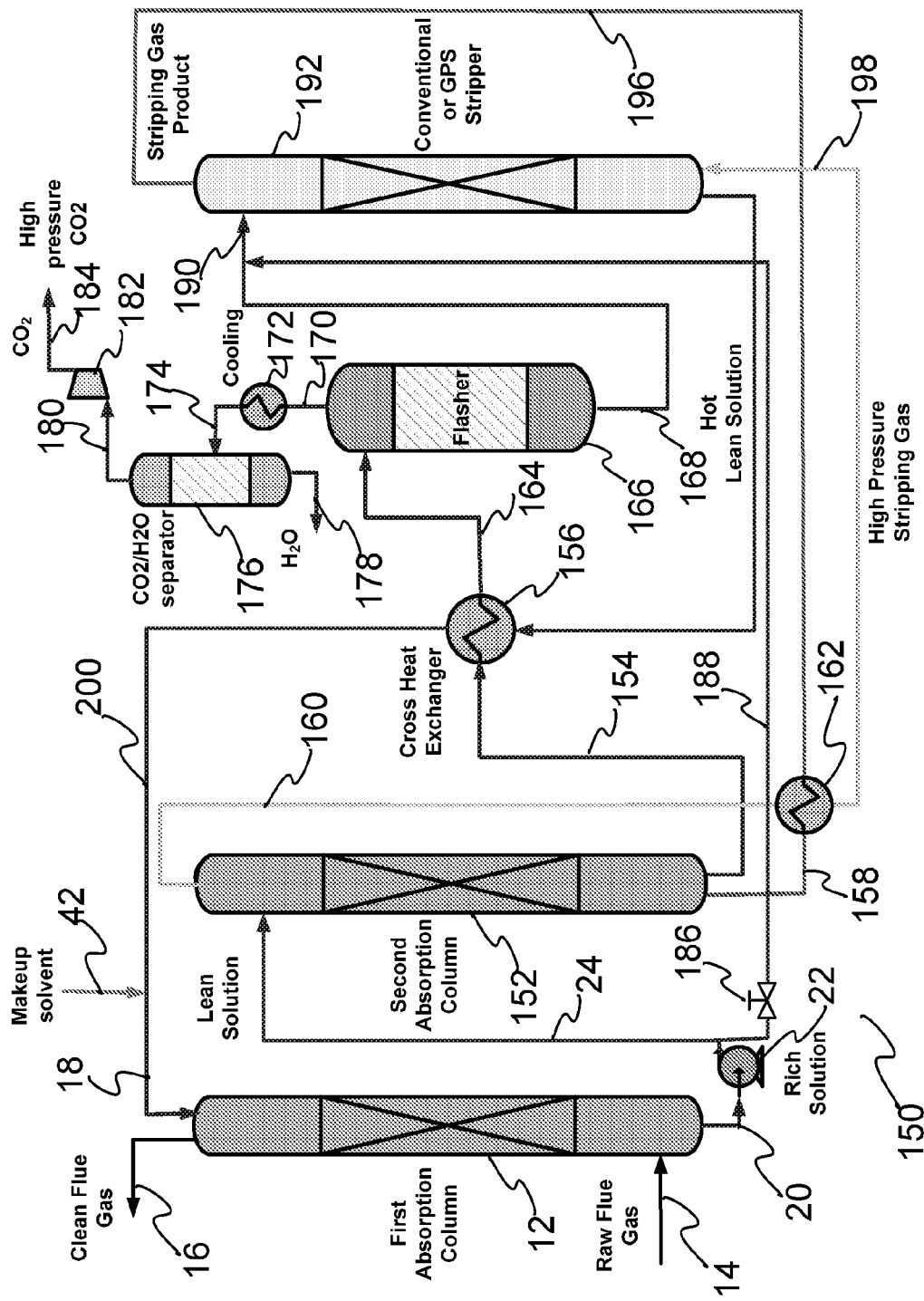
FIG. 4 is a schematic diagram of one embodiment of the process of the present invention.

FIG. 4 is a schematic diagram for one system 150 of the process sequences absorption/absorption/stripping (flashers)/high pressure gas stripping. Raw flue gas 14 enters the bottom of the absorption column 12 and clean flue gas 16 exits the top while a $CO_2$-lean solution 18 enters into the absorption column 12 from the top and flows downward producing a $CO_2$-rich solution exiting at 20. The $CO_2$-rich solution goes through pump 22 and in line 24 the rich solution (product-enriched liquid) from the bottom of the first absorption column 12 enters the second absorption column 152 from top to absorb $CO_2$ contained in the gaseous effluent flowing upward, which comes from the top of a conventional stripping column or a GPS column 192 through line 196, through heat exchanger 162 and line 158 to bottom of column 152. Gas exiting the column 152 at line 160 is directed through heat exchanger 162 and through line 198 to bottom of column 192. The $CO_2$ loaded rich solution (product-enriched liquid) from the bottom of the second absorber 152 is directed through line 154 through heat exchanger 156 and enters a flasher 166 (or a series of flashers) through line 164 to flash high pressure $CO_2$ out. $CO_2$ in line 170 from the flasher 166 is cooled in cooling unit 172 and supplied by line 174 to liquid gas separator 176 with liquid or water exiting at line 178 and gas exiting at line 180. The gas in line 180 is compressed in compressor 182 to sequestration-ready pressure for the gas at line 184 and the condensed water from the system 150 is removed via line 178. Multi-stage compression with inter-stage cooling can be used if required. The semi-rich solution (product-enriched liquid) from the bottom of the flasher 166 (or last flasher if there are more than one flasher) is directed through line 168 to a combined stream in line 190 then enters the GPS column 192 from the top. The high pressure stripping gas stream in line 198 enters the bottom of the GPS column 192 and strips the $CO_2$ from product-enriched liquid flowing countercurrent. After exchanging heat with gas exiting the second absorption column from line 160 in the heat exchanger 162, the gaseous effluent from the GPS column 192 enters the second absorption column 152 in line 154 as noted. In the second absorption column, the gaseous effluent from the GPS column 192 flows countercurrent to the product-enriched liquid from the first absorption column 12. After $CO_2$ is removed from the gaseous effluent by liquid in the second absorption column 152, the now $CO_2$-lean gaseous effluent passes back through the heat exchanger 162 and is recycled back to the GPS column 192 as the high pressure gas stream.

In the specification the term GPS column references a column 100, 120, 130, 140 or modifications thereof within the present invention. Column 192 is preferably a GPS column as noted but a conventional column could also be utilized in this system, however preferential results are believed to be achieved with the GPS column 100, 120, 130, 140 or minor variations thereof.

The $CO_2$-lean solution is directed from the column 192 to heat exchanger 156 to line 200 wherein make-up solvent (amine) may be added through line 42 into the lean solution before it enters the absorber in line 18 and the cycle repeats.

As noted above, a portion of the product-enriched liquid exiting from the first absorption column may be introduced into one or more additional absorption columns and contacted with a gas stream that comprises some or all of the gaseous effluent from the GPS column, to absorb more of the product gas into the product-enriched liquid. The product-enriched liquid exiting from the first absorption column 12 may be split into multiple streams via control valve 186 and line 188 combining with line 168 from the flasher 166 to form combined stream at line 190. $CO_2$ partial pressure (e.g. ~5 atm) in the gaseous effluent from the GPS column 192 is much higher than that in the original gaseous mixture (e.g., flue gas ~0.15 atm). Thus the working capacity of the liquid in the second absorption column 152 will be much higher than that of the liquid in the first absorption column 12. It is possible to use only a fraction product-enriched liquid exiting from the first absorption column 12 to absorb $CO_2$ contained in the gaseous effluent from the GPS column 192. The rest of the product-enriched liquid exiting from the first absorption column 12 can directly go to the GPS column 192 via line 188 or certain flasher if a series of flashers are used. As a result, the final loading of the product-enriched liquid exiting from the second absorption column 152 could be several times higher than that of the product-enriched liquid exiting from the first absorption column 12. A higher $CO_2$ loading in the liquid translates to a higher equilibrium $CO_2$ pressure in the stripper (flashers).

FIG. 4 is an example embodiment of the process of the present invention using repeated absorption/stripping steps. In this example, product-enriched liquid from the first absorption column is divided into two streams. Of course the split of rich solution is not necessary. FIG. 4 only displays two consecutive absorption columns. However, if necessary, multiple (more than two) consecutive absorption and stripping configurations are also possible. In this case the arrangement will be as follows: absorption/ . . . /absorption/absorption/stripping (flashing)/stripping/ . . . /stripping.

In certain embodiments of the present invention, the process further comprises after step (b) subjecting the high pressure gaseous effluent from the gas pressurized column to at least one final separation process to purify the product gas. In principle, many separation methods could be used to separate the product gas from the gaseous effluent. For example, the final separation process may comprise one or more condensation, cryogenic condensation, distillation, absorption, and/or adsorption steps or combined, in series or parallel.

Figure 5:
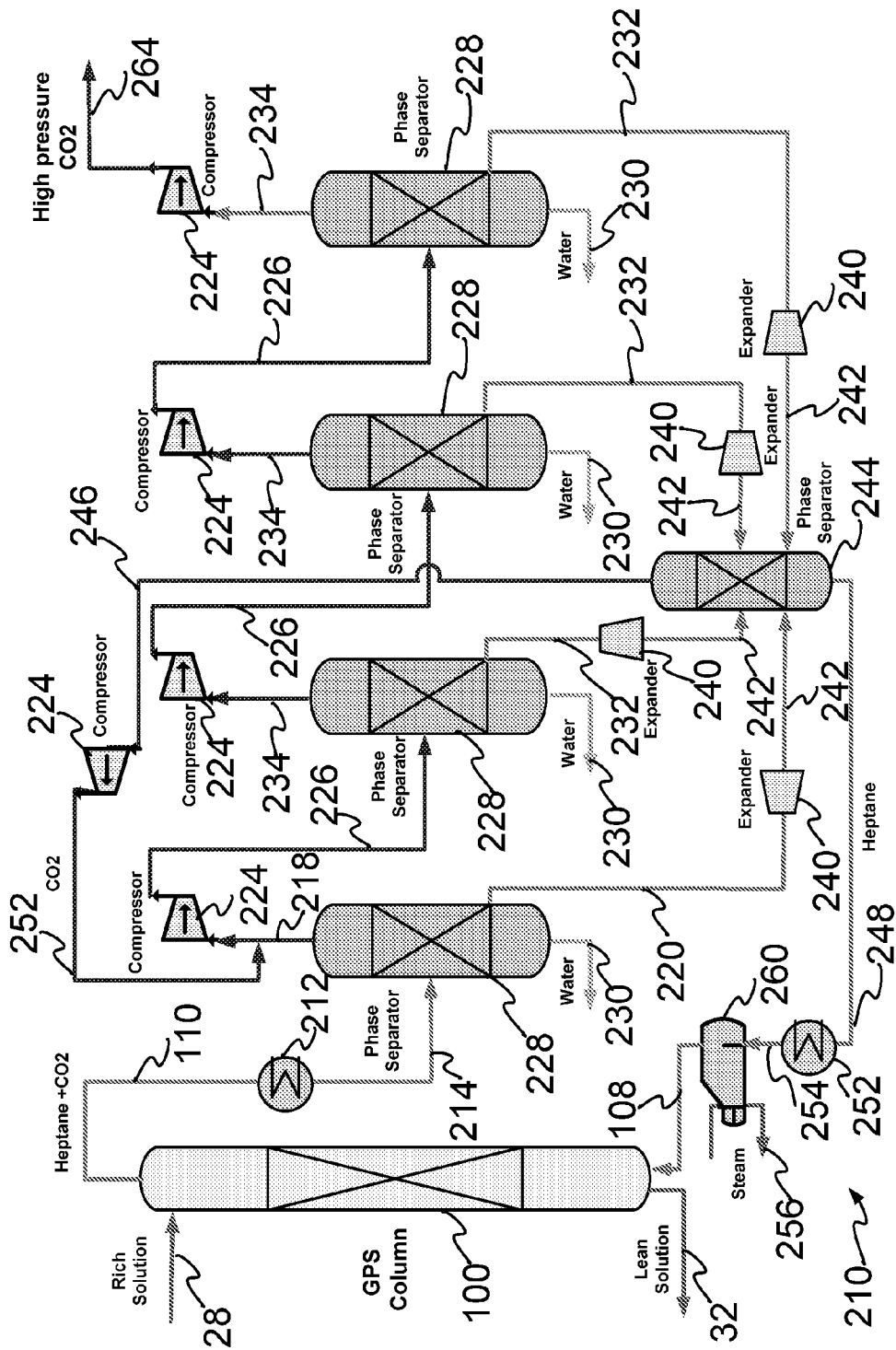
FIG. 5 is an exemplary schematic diagram of a separation process of one embodiment of the present invention using heptane as a high pressure gas stream to separate carbon dioxide from a liquid followed by condensation as a final separation process.

When the stripping gases used in the high pressure gas stream entering the GPS column have much higher boiling point than the product gas, such stripping gas or gases and the product gas can be easily separated through condensation. FIG. 5 is an example of many possible flow diagrams. In the embodiment with system 210 illustrated in FIG. 5, heptane vapor is used as the stripping gas in the high pressure gas stream.

In FIG. 5 rich solution enters column 100 at the top in line 28 and lean solution exits the bottom in line 32 as noted above. Further column 100 is illustrated, but any column 120, 130, 140 or variations thereof can be used. Stripping gas enters column 100 at 108 and exits in line 110 at the top of column 100. Line 110 leads to a first phase separator 216 through unit 212 and line 214. Water is drawn off of the separator 216 in line 222 and gas exits in line 218 to a compressor 224 to be directed in line 226 to a subsequent phase separator 228. Line 220 is directed from the separator 216 through an expander 240 to a phase separator 244 through line 242. Water is drawn off of the separator 228 in line 230 and gas exits in line 234 to a compressor 224 to be directed in line 226 to a subsequent phase separator 228. Line 232 is directed from the separator 228 through an expander 240 to a phase separator 244 through line 242. Additional or fewer phase separators 228 can be incorporated into the system 210 as dictated by desired operational parameters. The final separator 228 has line 264 providing the high pressure $CO_2$. The separator 244 has an exit line 246 extending to a compressor 250 to a line 252 combining with the line 218 from the first separator in the series, however it could be alternatively be directed to be combined with subsequent lines 234 as well. The separator 244 includes an outlet line 248 leading through unit 252 to line 254 to heating source 260, which is shown as a heat exchanger with steam line 256. The high pressure line 108 comes from the heating source 260.

Figure 6:
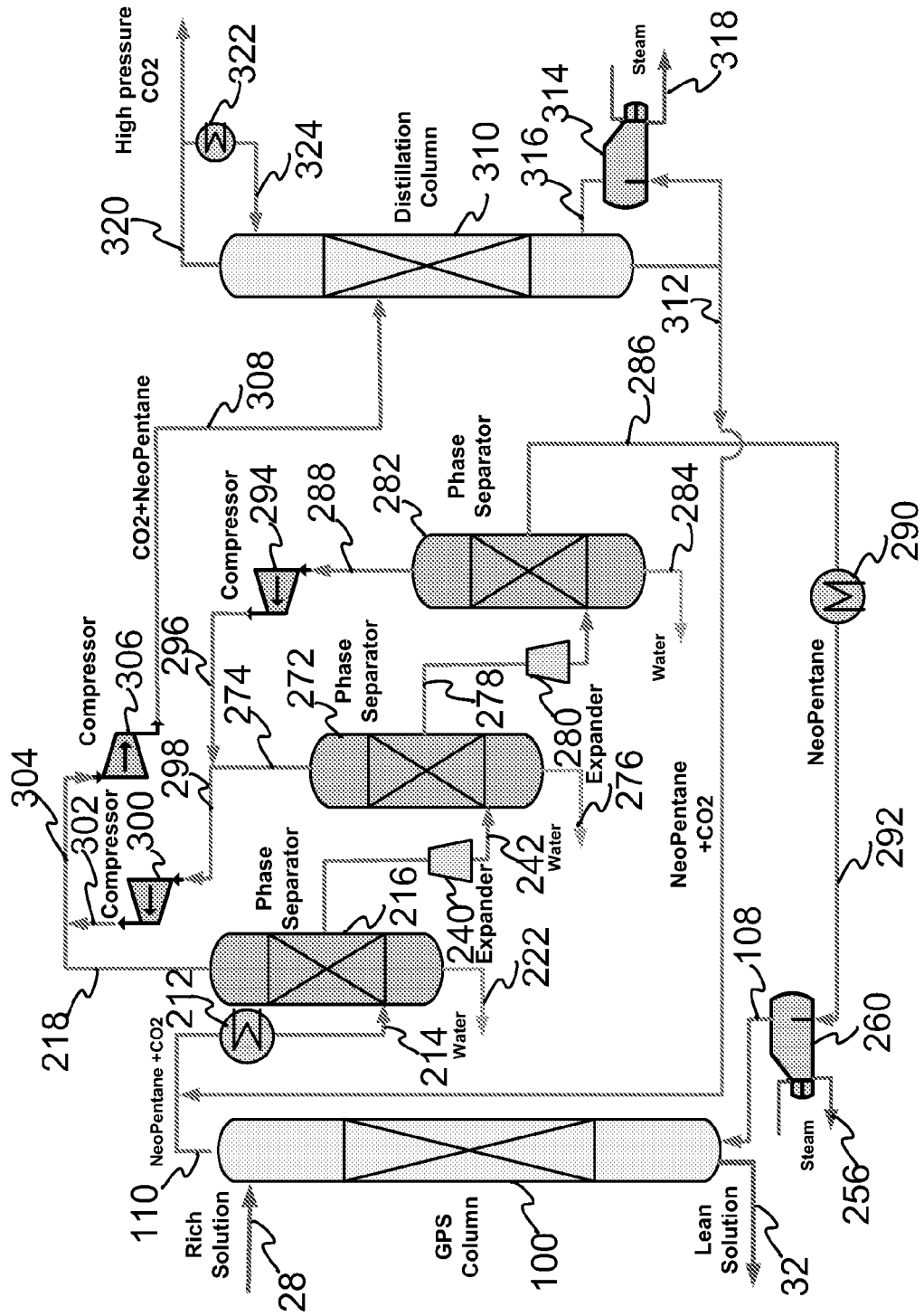
FIG. 6 is an exemplary schematic diagram of a separation process of one embodiment of the present invention using neopentane as a high pressure gas stream to separate carbon dioxide from a liquid followed by a combination of condensation and distillation as a final separation process.

When the volatility difference between stripping gases and the product gas are not significant enough, simple condensation may not be sufficient and a distillation column may be required to obtain pure product gas. FIG. 6 is an example of a system 270, where pure neo-pentane is used as the stripping gas. Neo-pentane has higher normal boiling point (~30° C.) than $CO_2$ and can be separated relatively easily with $CO_2$.

In FIG. 6, as above rich solution enters column 100 at the top in line 28 and lean solution exits the bottom in line 32. Further, again column 100 is illustrated, but any column 120, 130, 140 or variations thereof can be used. Stripping gas enters column 100 at 108 and exits in line 110 at the top of column 100. Line 110 leads to a first phase separator 216 through unit 212 and line 214. Water is drawn off of the separator 216 in line 222 and gas exits in line 218. Line 220 is directed from the separator 216 through an expander 240 to a phase separator 272 through line 242. Water is drawn off of the separator 272 in line 276 and gas exits in line 274. Line 278 is directed from the separator 272 through an expander 280 to a phase separator 282. Water is drawn off of the separator 282 in line 284 and gas exits in line 288. The separator 282 includes an outlet line 286 leading through unit 290 to line 292 to heating source 260, which is shown as a heat exchanger with steam line 256. The high pressure line 108 comes from the heating source 260. Gas line 288 leads to compressor 294 to line 296 that combines with line 274 forming line 298 leading to compressor 300. Outlet of the compressor 300 in line 302 is combined with line 218 to form line 304 leading to compressor 306 having outlet 308 leading to distillation column 310. The outlet 312 at the bottom of column 310 can be combined with line 110 in part and recycled to the column 310 through a heating unit 314, which may be a heat exchanger with a steam line 318. The outlet 320 of column 310 provides the high pressure $CO_2$ from the system with unit 322 have a recirculation line 324 extending to the column 310. Three phase separators 216, 272 and 282 are shown but more, or even less, separators could be incorporated into the system 270 effectively as shown depending upon the operational parameters desired.

In FIG. 6, the product gas coming from top of the GPS column 100 is cooled and neo-pentane and water are condensed out. Due to the immiscibility of water and neo-pentane they can be separated by a decanter. The condensed neo-pentane liquid may still contain considerable amount of $CO_2$. Since the liquid is under pressure it is therefore expanded through an expander and its pressure and temperature are reduced. After the expansion, the stream will contain a gas phase concentrated with $CO_2$ and a liquid phase concentrated with neo-pentane. A series of such condensers and expanders as shown can be used to achieve high neo-pentane purity. The gas phase concentrated in $CO_2$ is also under higher pressure and contains some neo-pentane. To achieve high purity $CO_2$, and reduce neo-pentane loss, a distillation column 310, or a series of columns 310, may be desired.

Figure 7:
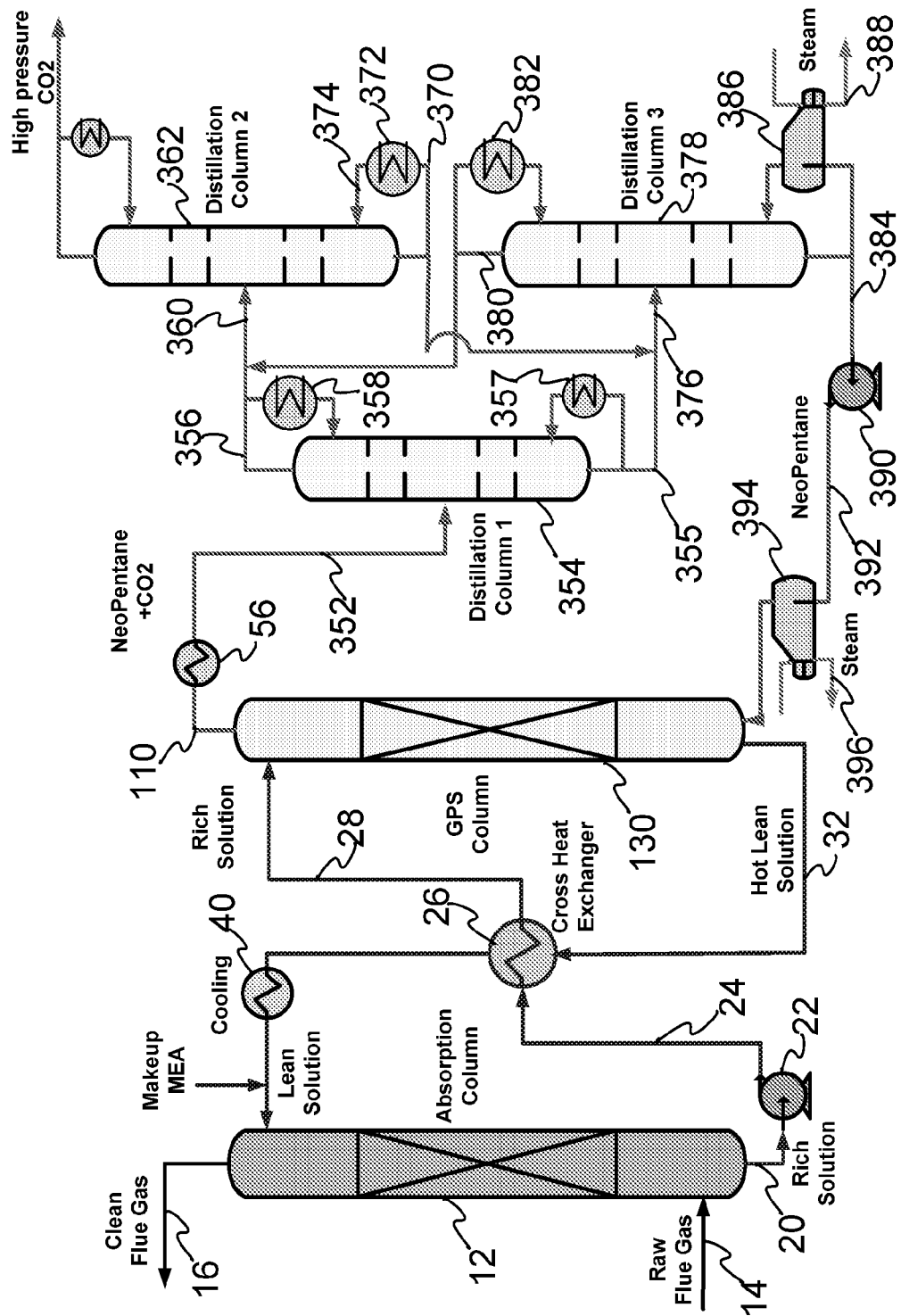
FIG. 7 is an exemplary schematic diagram of a separation process of one embodiment of the present invention using neopentane as a high pressure gas stream to separate carbon dioxide from a liquid followed by distillation as a final separation process.

When boiling point of the stripping gas is close to that of the product gas (low relative volatility coefficient), the separation processes may not be sufficient and a series of distillation columns may be required. FIG. 7 is an example of a system 350, where three distillation columns were used to obtain pure $CO_2$ and neo-pentane. In system 350 the details of the absorption column 12 and GPS column 130 are described above. Column 130 is illustrated, but any column 100, 120, 140 or variations thereof can be used. Stripping gas enters column 130 at 108 and exits in line 110 at the top of column 130, which can also be analogized to line 52 described above. Line 110 goes through cooling unit 56, which may have a return (not shown here) to the GPS column 130, to the first distillation column 354 in line 352. Gas exits column 354 at line 356 and unit 358 may have a return to the column 354. The line 356 combines with gas exiting in line 380 from the third distillation column 378 in line 360 to enter the second distillation column 362. High pressure $CO_2$ exits the second distillation column 362 with unit 366 providing a return line 368 to the column 362. Liquid in line 355 from the first column 354 may be re-circulated to the column 354 through unit 357 or combined with the outlet 370 from the second distillation column 362 to be directed in line 376 to the third distillation column 378. Similarly, liquid in line 370 from the second column 362 may be re-circulated to the column 362 through unit 372 and line 374 or combined with the outlet 355 from the first distillation column 354 to be directed in line 376 to the third distillation column 378. The gas outlet 380 of the third column 378 may be returned through unit 382 to the column 378 or combined with outlet 356 to form line 360 as noted above. The liquid outlet 384 of the third distillation column 378 may be, in part, re-circulated to the column 378 through a heating source 386 such as a heat exchanger 386 with steam line 388, and in part directed through pump 390 through line 392 to heat source 394 in the form of a heat exchanger with steam line 396, wherein line 108 exits from the heat source 394.

FIG. 7 illustrates only one of the many possible distillation sequences. Other different sequences are possible. In principle, one column will be enough to separate $CO_2$ and neo-pentane (or any two component mixture) as long as they do not form an azeotrope. However, thermodynamic efficiency of these distillation sequences will be different.

Figure 8:
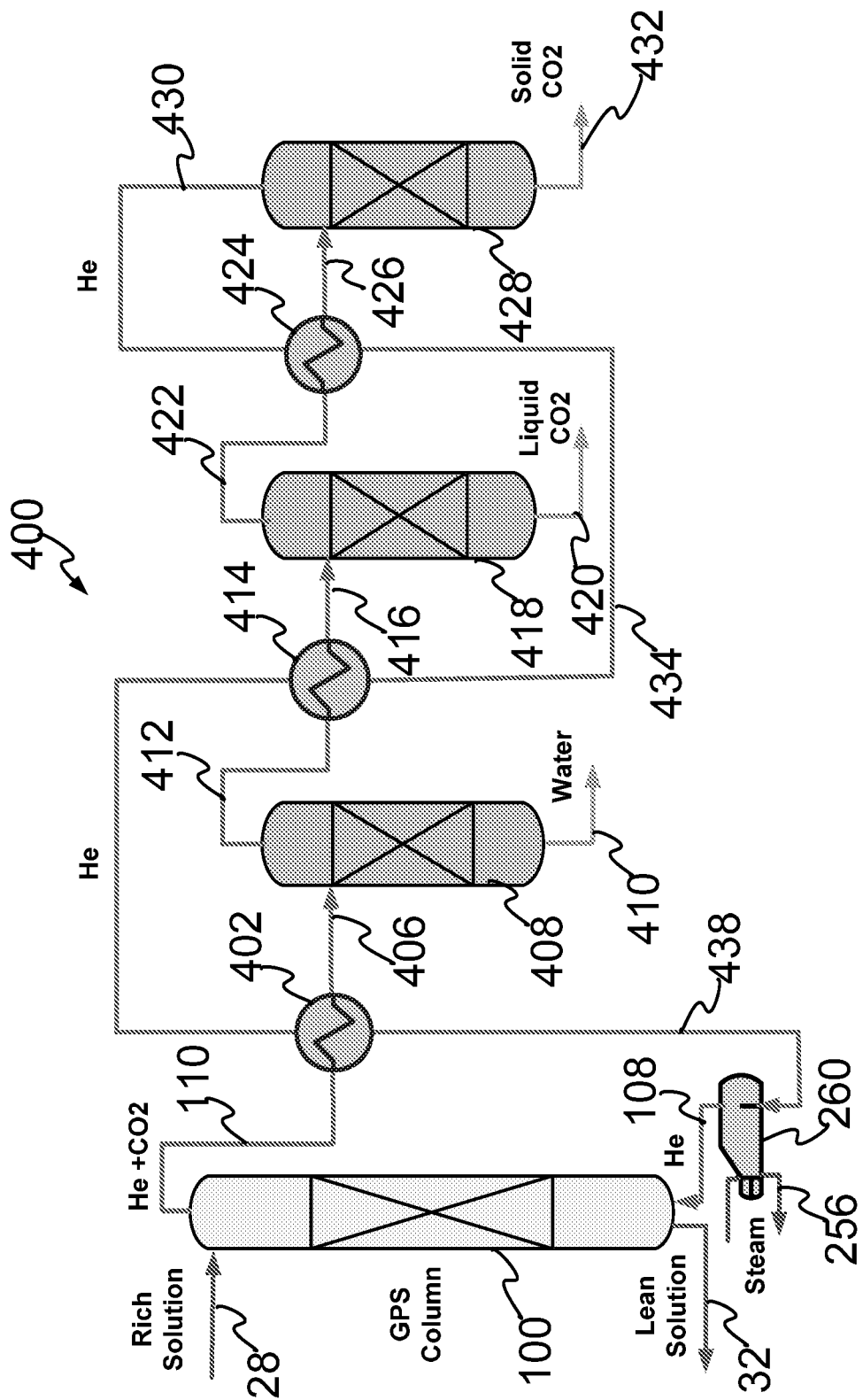
FIG. 8 is an exemplary schematic diagram of a separation process of one embodiment of the present invention using helium as a high pressure gas stream to separate carbon dioxide from a liquid followed by cryogenic condensation as a final separation process.

The previous three embodiments are for stripping gases that are less volatile than the product gas. Gases such as He, Ar, $N_2$, $O_2$ or their mixture or air have lower boiling points than $CO_2$. When they are used as the stripping gas, $CO_2$ will be condensed out first if the stripping gas product is cooled. $CO_2$ will be condensed out as liquid if its partial pressure in the product gas is higher than the vapor pressure of $CO_2$ at triple point (5.1 atm). When its partial pressure is below vapor pressure at triple point it will be condensed out as solid (dry ice). System 400 of FIG. 8 is an example of $CO_2$ separation from stripping gas product when He is used as the stripping gas. In this process, the stripping product gas is cooled and the moisture in the product stripping gas is removed. It is then further cooled to remove some of the $CO_2$ as liquid if initial partial pressure is >5.1 atm. If the partial pressure of $CO_2$ in the product gas is <5.1 atm then all $CO_2$ will be condensed out as a solid (called frosting or anti-sublimation). In this example, only simple condensation steps were used. If simple condensation is not sufficient a cryogenic distillation process may be used to obtain pure $CO_2$.

FIG. 8 does not depict any refrigeration systems that are required for cryogenic separation process. However, such a design is evident to one skilled in the art. Specifically in FIG. 8, as above rich solution enters column 100 at the top in line 28 and lean solution exits the bottom in line 32. Further, again column 100 is illustrated, but any column 120, 130, 140 or variations thereof can be used. Stripping gas enters column 100 at 108 and exits in line 110 at the top of column 100. Line 110 leads to a heat exchanger 402 to a first phase separator or cooling unit 408 through line 406. Water is drawn off of the separator 408 in line 410 and gas exits in line 412. Line 412 leads to a heat exchanger 414 to a second phase separator or cooling unit 418 through line 416. Here liquid $CO_2$ is drawn off of the separator 418 in line 420 and gas exits in line 422. Line 422 leads to a heat exchanger 424 to a third phase separator or cooling unit 428 through line 426. Here liquid/solid $CO_2$ is drawn off of the separator 428 in line 432 and gas exits in line 430. Line 430 extends to heat exchanger 424, to line 434, to exchanger 414 to line 436 to exchanger 438 and finally to heat source 260. Heat source 260 is in the form of a heat exchanger with steam line 256 with line 108 coming from the heat source 260.

Figure 9:
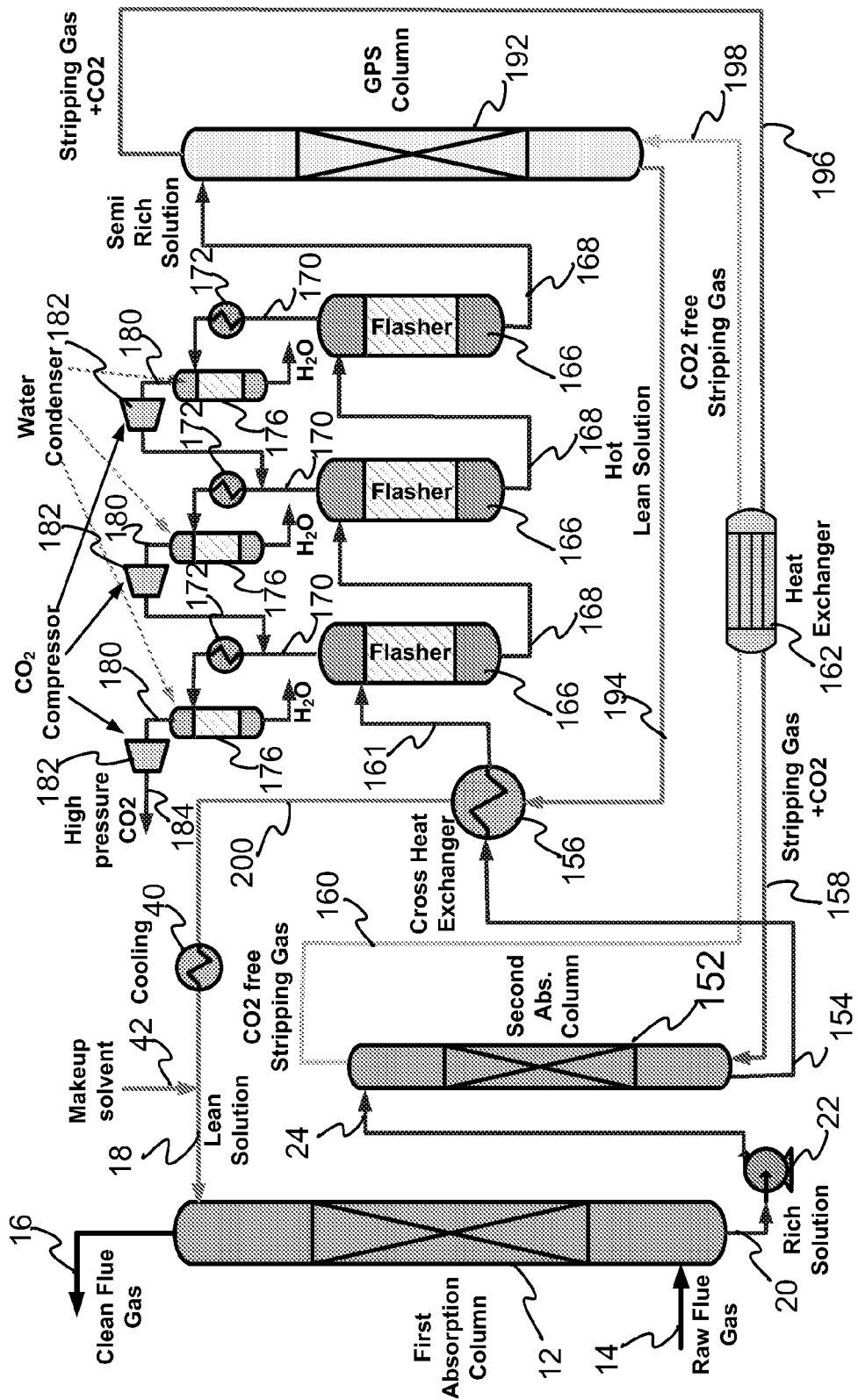
FIG. 9 is an exemplary schematic diagram of an alternative embodiment of the invention using multiple absorption steps integrated with a stripping step in a gas pressurized column.

FIG. 9 is the schematic diagram of an example when both the repeated absorption/stripping process and GPS column are used to recover carbon dioxide as a product gas from a gaseous mixture. However, here the entire product-enriched liquid from the first absorption column is introduced into the second absorption column. The product-enriched liquid exiting from the second absorption column has high loading and will be able to produce a high pressure pure product gas stream through a series of flashers (FIG. 9 showed three flashers). After the flashers, the $CO_2$ loading in the solution will be reduced. The less rich solution is then introduced into the GPS column to produce a mixture of stripping gas and $CO_2$. The product gas mixture is recycled to the second absorption column after exchanging heat with the $CO_2$ free (may contain small amount of $CO_2$). After the GPS process, the lean solution from the stripper is recycled to the first absorber after exchanging heat with the rich solution and a new cycle begins.

Specifically in the system 450 of FIG. 9, as with the above systems, raw flue gas 14 enters the bottom of the absorption column 12 and clean flue gas 16 exits the top while a $CO_2$-lean solution 18 enters into the absorption column 12 from the top and flows downward producing a $CO_2$-rich solution exiting at 20. The $CO_2$-rich solution goes through pump 22 and, in line 24, the rich solution (product-enriched liquid) from the bottom of the first absorption column 12 enters the second absorption column 152 from top to absorb $CO_2$ contained in the gaseous effluent flowing upward, which comes from the top of a conventional stripping column or a GPS column 192 through line 196, through heat exchanger 162 and line 158 to bottom of column 152. Gas exiting the column 152 at line 160 is directed through heat exchanger 162 and through line 198 to bottom of column 192. The $CO_2$ loaded rich solution (product-enriched liquid) from the bottom of the second absorber 152 is directed through line 154 through heat exchanger 156 and enters a first flasher 166 of, here, a series of flashers 166, through line 164 to flash high pressure $CO_2$ out. $CO_2$ in line 170 from the flasher 166 is cooled in cooling unit 172 and supplied by line 174 to liquid gas separator 176 with liquid or water exiting at line 178 and gas exiting at line 180. The gas in line 180 is compressed in compressor 182 to sequestration-ready pressure for the gas at line 184 and the condensed water from the system 150 is removed via line 178. The exit line 168 from the first flasher 166 enters a second of the series of flashers 166. $CO_2$ in line 170 from the second and subsequent flashers 166 is cooled in a respective cooling unit 172 and supplied by line 174 to liquid gas separator 176 with liquid or water exiting at line 178 and gas exiting at line 180, wherein the gas in line 180 is compressed in compressor 182 then combined with the outlet 170 of the upstream flasher 160 as shown. Thus multi-stage compression with inter-stage cooling is used from the downstream flashers 166. The semi-rich solution (product-enriched liquid) from the bottom of the last flasher 166 is directed to the GPS column 192 from the top. The high pressure stripping gas stream in line 198 enters the bottom of the GPS column 192 and strips the $CO_2$ from product-enriched liquid flowing countercurrent. After exchanging heat with gas exiting the second absorption column from line 160 in the heat exchanger 162, the gaseous effluent from the GPS column 192 enters the second absorption column 152 in line 154 as noted. In the second absorption column, the gaseous effluent from the GPS column 192 flows countercurrent to the product-enriched liquid from the first absorption column 12. After $CO_2$ is removed from the gaseous effluent by liquid in the second absorption column 152, the now $CO_2$-lean gaseous effluent passes back through the heat exchanger 162 and is recycled back to the GPS column 192 as the high pressure gas stream. The $CO_2$-lean solution is directed via line 194 from the column 192 to heat exchanger 156 to line 200 through cooling unit 400 wherein make-up solvent (amine) may be added through line 42 into the lean solution before it enters the absorber in line 18 and the cycle repeats.

Figure 10:
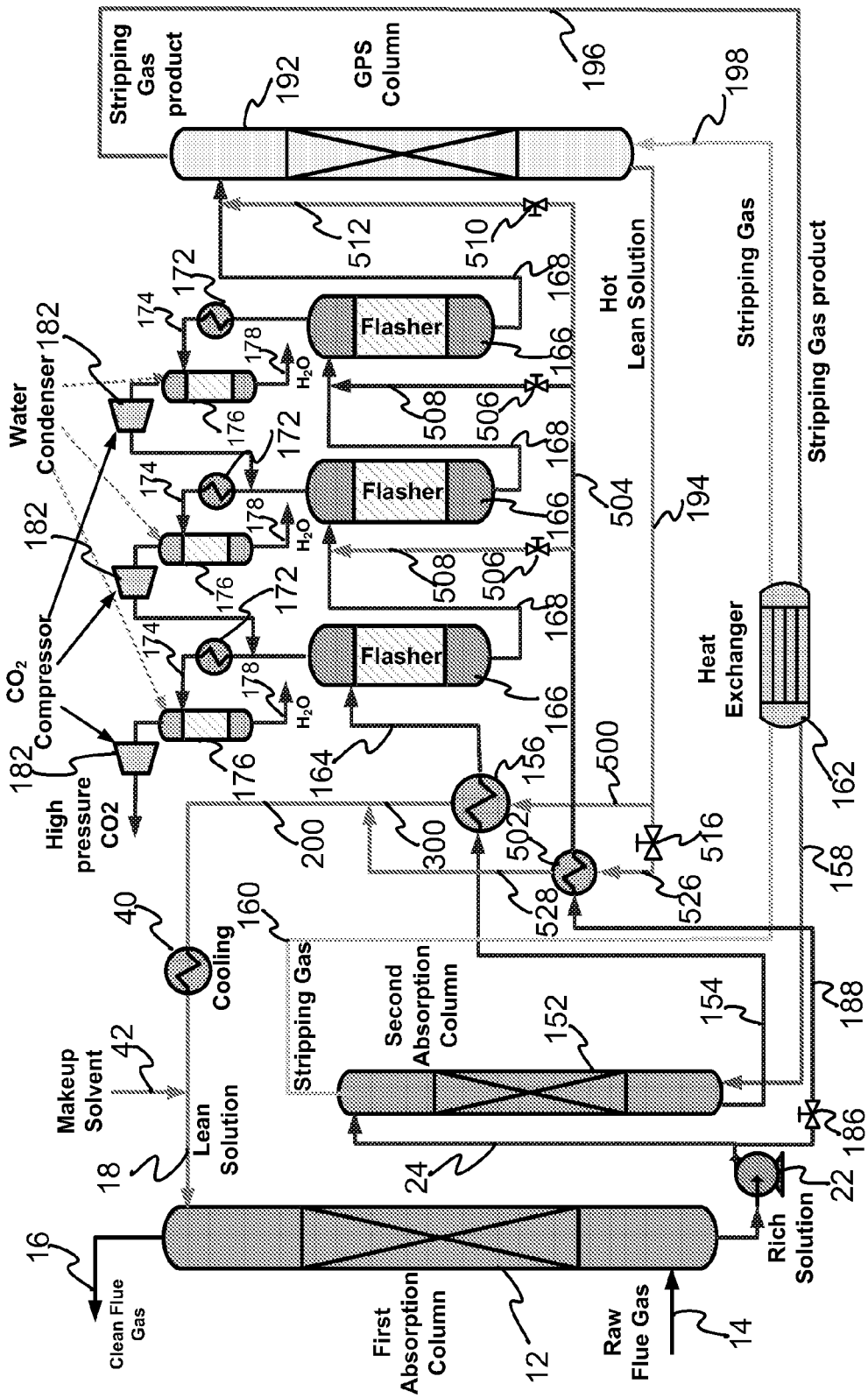
FIG. 10 is an exemplary schematic diagram of an alternative embodiment of the invention using repeated absorption and stripping steps.

System 500 of FIG. 10 is another embodiment, where both a GPS column and the repeated absorption/stripping are used. In this configuration, however, only a fraction of the product-enriched liquid from the first absorber 12 is introduced to the second absorption column 152. The rest of it may be further divided and directly goes to the flashers or the GPS column depending on the loading. Ideally the product gas loading in the product-enriched liquid is higher than the product gas loading in the flasher entering but lower than the upstream neighboring flasher. Essentially the system 500 is similar to system 450 described above except that line 24 included valve 186 for directing a substantial portion through line 188 through heat exchanger 502 to line 504. Line 504 is coupled through control valves 506 and lines 508 to the input lines 168 of the subsequent flashers 166, and through valve 510 and line 512 to the input line 168 of the GPS column 192. Outlet 194 includes control valve 516 and line 526 leading to heat exchanger 502 with line 528 leading from heat exchanger 502 to combine with line 200 from heat exchanger 156. Outlet 194 also leads to line 520 leading to heat exchanger 156. These additions provide for greater control possibilities for the system 500 over the system 450.

In the representative FIGS. 1-10 of this application not all blowers or pumps or valves are illustrated as the use of these are well known to those of ordinary skill in the art. Only a representative sample of these elements are specifically illustrated in the figures to evidence there presence in an operational system. Additionally no shown are the controllers and system sensors used for operating similar systems, but these are also known to those of ordinary skill in the art.

Computer simulations were conducted for the process of the present invention. Only five representative processes were simulated and their results are listed in Table 2. Computer simulations were all limited to equilibrium calculations. No kinetic simulations (or called rate based) were performed. The first two processes are both conventional absorption/stripping processes, one uses MEA (methyl ethanolamine, 30 wt. %) and the other uses MDEA (methyl dimethanolamine, 50 wt. %). The third process uses 30% MEA solution as solvent and neo-pentane as stripping gas. Condensation/distillation combined separation method (embodiment two) was used to separate neo-pentane and $CO_2$. The fourth and the last one both use GPS/repeated absorption process. The fourth uses MEA as solvent and the last one uses MDEA/MEA (40%/10%) mixture as solvent.

TABLE 2

Energy Performances Comparisons of the Process of the Present Invention with Conventional Separation Processes

| Process | MEA conventional | MDEA conventional | MEA GPS/ Distillation | MEA GPS/ Absorption | MDEA/ MEA GPS/ Absorption |
|---|---|---|---|---|---|
| Operating Pressure (atm.) | 1.8 | 1.8 | 20 | 20 | 20 |
| Reaction Heat BTU/lbCO$_2$ | 800 | 590 | 800 | 1000 | 900 |
| Sensible Heat BTU/lbCO$_2$ | 480 | 410 | 260 | 260 | 200 |
| Stripping Heat BTU/lbCO$_2$ | 270 | 300 | 80 | 80 | 60 |
| Other Heat* BTU/lbCO$_2$ | 0 | 0 | 350 | 0 | 0 |
| Total Heat BTU/lbCO$_2$ | 1550 | 1300 | 1490 | 1340 | 1160 |
| Refrigeration** kWh/kgCO$_2$ | 0 | 0 | 0.02 | 0 | 0 |
| Compr. Work kWh/kgCO$_2$ | 0.1 | 0.1 | 0.03 | 0.02 | 0.01 |
| Electricity Equivalent kWh/kgCO$_2$ | 0.38 | 0.33 | 0.32 | 0.26 | 0.22 |

*other heat includes the heat required in condensation/distillation process.
**refrigeration is required in the condensers at the top of the distillation columns.

Table 2 showed that all the embodiments of the process of the present invention demonstrated improved energy performance compared to the conventional processes. MDEA/MEA mixed solvent with GPS/Absorption has the best energy performance. This is expected since MDEA has smaller heat of absorption and larger absorption capacity. Under simulated process conditions (not optimized), the invented process is able to reduce the heat consumption by about 30% compared to the current MEA-based $CO_2$ capture system and reduce the compression work by about 90%. Comparing each component, it is clear that the invented GPS/repeated absorption process can almost reduce the stripping heat by 78%.

The above description and associated figures are intended to be illustrative of the present invention and not be restrictive thereof. A number of variations may be made to the present invention without departing from the spirit and scope thereof. The scope of the present invention is defined by the appended claims and equivalents thereto.

What is claimed is:

1. A process for separating a product gas from a gaseous mixture to yield a high pressure gaseous effluent in which the product gas has a partial pressure higher than in the gaseous mixture, comprising:
   (a) introducing the gaseous mixture into contact with one or more liquid in an absorption apparatus, to absorb the product gas into the liquid and yield one or more product-enriched liquid;
   (b) introducing the product-enriched liquid into at least one inlet of a gas pressurized column and into contact with one or more high pressure gas streams to strip the product gas into the high pressure gas stream and to yield one or more product-lean liquid and one or more high pressure gaseous effluents enriched with the product gas, wherein the gas pressurized column includes heat apparatus supplying heat independently at multiple positions along the gas pressurized column including positions having distinct product gas loadings between the leanest position and the richest position along the gas pressurized column thereby allowing for independent control of the temperature along the gas pressurized column;
   (c) recovering heat from the product-lean liquid; and
   (d) recycling at least a portion of the product-lean liquid to step (a).

2. A process for separating a product gas from a gaseous mixture to yield a high pressure gaseous effluent in which the product gas has a partial pressure at least 10 times higher than in the gaseous mixture, comprising:
   (a) introducing the gaseous mixture into contact with one or more liquid in an absorption apparatus, to absorb the product gas into the liquid and yield one or more product-enriched liquid;
   (b) introducing the product-enriched liquid into at least one inlet of a gas pressurized column and into contact with one or more high pressure gas streams to strip the product gas into the high pressure gas stream and to yield one or more product-lean liquid and one or more high pressure gaseous effluents enriched with the product gas;
   (c) recovering heat from the product-lean liquid; and (d) recycling at least a portion of the product-lean liquid to step (a); and further comprising after step (a) and before step (b), (i) introducing at least a portion of the product-enriched liquid from the absorption apparatus in step (a) into at least one additional absorption apparatus and into contact with a gas stream that comprises at least a portion of the gaseous effluent from the gas pressurized column in step (b), to absorb the product gas into the product-enriched liquid and yield a further product-enriched liquid; and (ii) subsequently introducing the further product-enriched liquid from the additional absorption apparatus into at least one flasher to recover a portion of the product gas prior to introduction of the product-enriched liquid into the gas pressurized column in step (b).

3. The process of claim 2, wherein more than one additional absorption apparatus is used and they are arranged in series, with at least a portion of the product-enriched liquid leaving each absorber being introduced into the subsequent absorber and one or more additional gas pressurized column as described in step (b) is used between step (ii) and step (b) and they are arranged in series, with at least a portion of the product lean liquid leaving each gas pressurized column being introduced into the subsequent column.

4. The process of claim 1, further comprising after step (b) subjecting the high pressure gaseous effluent from the gas pressurized column to at least one separation process to separate the product gas from the high pressure gaseous effluent.

5. The process of claim 4, wherein the separation process comprises condensation, cryogenic condensation, distillation, absorption, adsorption, and combinations thereof.

6. The process of claim 1, wherein the gaseous mixture contains carbon dioxide.

7. The process of claim 6, wherein the gaseous mixture comprises combustion flue gas from a carbonaceous fuel burning facility.

8. The process of claim 1, wherein the product gas comprises carbon dioxide.

9. The process of claim 1, wherein the high pressure gas stream comprises a single pure gas.

10. The process of claim 1, wherein the high pressure gas stream comprises a mixture of different gases.

11. The process of claim 1, wherein the high pressure gas stream contains carbon dioxide.

12. The process of claim 1, wherein the high pressure gas stream is nitrogen.

13. The process of claim 1, wherein the gas pressurized column used in step (b) comprises: a gas pressurized stripping column with at least one first inlet allowing flow of one or more liquid streams in a first direction and at least one second inlet allowing flow of one or more high pressure gas streams in a second direction, to strip the product gas into the high pressure gas stream and yield through at least one outlet a high pressure gaseous effluent that contains the product gas.

14. A gas pressurized separation system to strip a product gas from a liquid stream to yield a high pressure gaseous effluent that contains the product gas, the system comprising:
(a) a gas pressurized stripping apparatus with at least one first inlet allowing flow of one or more liquid streams into the apparatus and at least one second inlet allowing flow of one or more high pressure gas streams into the apparatus, to strip the product gas into the high pressure gas stream and yield through at least one outlet a high pressure gaseous effluent that contains the product gas; and
(b) heat supply apparatuses supplying heat independently at multiple positions along the gas pressurized stripping apparatus including positions having distinct product gas loadings between the leanest position and the richest position along the gas pressurized stripping apparatus thereby allowing for independent control of the temperature along the stripping column.

15. The gas pressurized separation system of claim 14, wherein the heat supplying apparatuses are connected to each other.

16. The gas pressurized separation system of claim 14, wherein the heat supplying apparatuses are separate from each other.

17. The gas pressurized separation system of claim 14, wherein the heat supplying apparatuses are internal to the gas pressurized stripping column.

18. The gas pressurized separation system of claim 14, wherein the heat supplying apparatuses provide heats are external to the gas pressurized stripping column.

19. The gas pressurized separation system of claim 14, wherein the heat is provided through the high pressure stripping gas streams and wherein the second inlet allows for flow of one or more high pressure gas streams at a pressure of at least 4 atm.

20. A method of independently controlling the temperature along a gas pressurized separation system configured to strip a product gas from a liquid stream to yield a high pressure gaseous effluent that contains the product gas, the method comprising:
(a) Providing a gas pressurized stripping apparatus with at least one first inlet allowing flow of one or more liquid streams into the apparatus and at least one second inlet allowing flow of one or more high pressure gas streams into the apparatus, to strip the product gas into the high pressure gas stream and yield through at least one outlet a high pressure gaseous effluent that contains the product gas; and
(b) Independently heating at least three or more different locations along the column which have distinct product gas loadings at the heating locations thereby allowing for independent control of the temperature along the stripping column.

\* \* \* \* \*